_United States Patent_ [19]

Raudenbusch et al.

[11] 4,405,662

[45] Sep. 20, 1983

[54] THERMOSETTING RESINOUS BINDER COMPOSITIONS AND THEIR USE AS COATING MATERIALS

[75] Inventors: Werner T. Raudenbusch; Adrianus J. M. Barnhoorn; Petrus G. Kooijmans; Willem L. Sederel; Adrianus M. C. Van Steenis; Theresia F. M. Schets, all of Amsterdam, Netherlands

[73] Assignee: Shell Oil Company, Houston, Tex.

[21] Appl. No.: 423,407

[22] Filed: Sep. 24, 1982

[30] Foreign Application Priority Data

Nov. 5, 1981 [GB] United Kingdom ................. 8133385

[51] Int. Cl.$^3$ .............................................. B05D 3/02
[52] U.S. Cl. .................................... 427/386; 523/402; 523/403; 523/414; 525/172; 525/438; 525/533; 528/103; 528/110; 528/111; 528/291; 528/297; 528/302; 528/361
[58] Field of Search ................ 427/386; 528/110, 103, 528/291, 297, 111, 302, 361; 525/172, 438, 533; 523/402, 403, 414

[56] References Cited

U.S. PATENT DOCUMENTS 3,985,695 10/1976 Tobias et al. .................. 528/103 X
4,148,772 4/1979 Marchetti et al. .............. 528/110 X
4,332,711 6/1982 Kooijmans et al. .................. 523/402
4,362,847 12/1982 Kooijmans et al. ............ 525/172 X

FOREIGN PATENT DOCUMENTS 1418372 12/1975 United Kingdom .

_Primary Examiner_—Earl A. Nielsen
_Attorney, Agent, or Firm_—Norris E. Faringer

[57] ABSTRACT

A thermosetting resinous binder composition, heat-curable in combination with a transesterification-promoting metal compound as a catalyst to provide an insoluble infusible coating, comprising a mixture of:

(1) a non-acidic resinous compound essentially free of ethylenical unsaturation, having a molecular weight of at least 900 and a hydroxyl content of at least 0.2 equivalent per 100 g, and
(2) as cross-linking agent a non-acidic polyester of a polycarboxylic acid having more than one beta-hydroxyl ester group molecule, at least one of components (1) and (2) having a hydroxyl or beta-hydroxyl ester functionality, respectively, of more than 2, characterized in that the beta-hydroxyl ester group is substituted in the gamma-position by a hydroxyl, amino and/or transferable ester group derived from a polycarboxylic acid.

8 Claims, No Drawings

THERMOSETTING RESINOUS BINDER COMPOSITIONS AND THEIR USE AS COATING MATERIALS

FIELD OF THE INVENTION

The invention relates to novel thermosetting resinous binder compositions which can be cured by a transesterification mechanism. The invention further relates to the use of coatings, in particular in water-borne paints, such as for cathodic electrodeposition paints.

BACKGROUND OF THE INVENTION

Thermosetting coating compositions usually contain a hydroxyl or epoxy-containing component and a cross-linking component; curing catalysts are often added to reduce curing time and/or temperature. Curing times of up to ½ hour and curing temperatures of up to 200° C. are for many purposes acceptable in the thermosetting coating field.

The cross-linking component reacts during stoving with hydroxyl and/or epoxy groups of the main binder component, and the cross-linking provides a coating which is insoluble and infusible, and therefore resistant to solvents and elevated temperatures.

Another type of coating materials contains an air-drying binder, which can cross-link through carbon-carbon double bonds, in contact with oxygen; drying accelerators are here some metal compounds, such as Co- and Mn-naphthenate.

U.S. Pat. No. 4,332,711, issued June 1, 1982 discloses a thermosetting binder composition comprising:
(I) a mixture or precondensate of
 (1) a non-acidic resinous compound essentially free of ethylenical unsaturation, having a molecular weight of at least 900 and a hydroxyl content of at least 0.2 equivalents per 100 g, and
 (2) as cross-linking agent a non-acidic polyester of a polycarboxylic acid, having more than one beta-hydroxyl ester group per molecule, at least one of components (1) and (2) having a hydroxyl functionality of more than 2, and
(II) as curing catalyst a transesterification-promoting metal salt or metal complex which is soluble in liquid hydro carbons.

U.S. patent application Ser. No. 255,196, filed Apr. 20, 1981, now U.S. Pat. No. 4,362,847, issued Dec. 7, 1982, describes similar compositions, in which the transesterification-promoting metal compound (II) is insoluble in liquid hydrocarbons.

Such curing systems operate by transesterification of the ester groups of the cross-linking agent with hydroxyl groups of the resinous compound, with elimination of a glycol.

According to the prior applications, the glycol part of component (I) (2) may have substituents such as alkyl-, ether- or stable ester groups, such as those derived from branched mono-carboxylic acids. It has been demonstrated that this ester group does not generally react.

SUMMARY OF THE INVENTION

The present invention provides an improvement of prior art compositions in that the cross-linking component has further active groups with respect to the ester group in the gamma-position, such as hydroxyl, amino and/or transferable ester groups derived from polycarboxylic acids. Incorporation of such groups may provide various advantages in the curing step, such as better cure at lower temperature, removal of amino nitrogen, reduced weight loss, and better appearance.

DESCRIPTION OF THE PREFERRED EMBODIMENTS

The present invention can therefore be defined as a thermosetting resinous binder composition, heat-curable in combination with a transesterification-promotion metal compound as a catalyst to provide an insoluble infusible coating, comprising a mixture of:
 (1) a non-acidic resinous compound essentially free of ethylenical unsaturation, having a molecular weight of at least 900 and a hydroxyl content of at least 0.2 equivalent per 100 g, and
 (2) as cross-linking agent a non-acidic polyester of a polycarboxylic acid having more than one beta-hydroxyl ester group per molecule, at least one of components (1) and (2) having a hydroxyl or beta-hydroxyl ester functionality, respectively, of more than 2, characterized in that the beta-hydroxyl ester group is substituted in the gamma-position by a hydroxyl, amino and/or transferable ester group derived from a polycarboxylic acid.

In this context some general expressions are defined and explained as follows:

Non-acidic means that the material has an acid value of not more than 0.18 meq/g (acid number not more than 10). This will allow a residual acid content which in some cases is inevitable in praxis due to the method of preparation. Preferably, the acid content is not more than 0.1 meq/g, and for systems intended for cathodic electrodeposition the acid content is preferably not more than 0.02 meq/g; all values are based on solid material.

Hydroxyl means aliphatic or cycloaliphatic hydroxyl, not phenolic hydroxyl.

Beta-hydroxyl ester in the definition of component (2) means that the carbon atom adjacent to the esterified hydroxyl group has a free hydroxyl group. According to the invention the component (2) has now further reactive groups in the gamma-position.

Component (1) has a hydroxyl content of at least 0.2 equivalent, and preferably not more than 0.8 equivalent per 100 g. Component (1) should be a soluble, fusible compound. Component (1) may be chosen from several classes of hydroxyl-containing materials, such as alkyd resins, epoxy resins, including the linear polymeric type derivatives of bisphenol A and epichlorohydrin, esters of epoxy resins, amine adducts of epoxy resins, and polymers prepared by the polymerization or copolymerization of ethylenically unsaturated monomers.

A preferred type of alkyd resin is an alkyd resin prepared from a polycarboxylic acid or anhydride thereof, a polyhydric alcohol, and glycidyl esters of branched monocarboxylic acids.

Another preferred component (1) is an epoxy resin or derivative thereof. Preferred epoxy resins are glycidyl ethers of 2,2-bis(4-hydroxyphenyl)propane having the general formula:

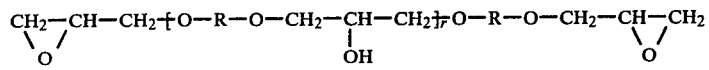

wherein R is the group:

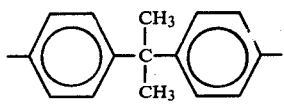

and r is a number which for epoxy resins of different molecular weight can differ. For making soluble derivatives preference is given to liquid or semi-liquid epoxy resins (wherein r has a value of from 0 to 1) or to the lower solid epoxy resins wherein r has a value of up to 4; epoxy resins which are suitable without modification have a molecular weight of more than 1400, and r has a value of more than 4. In the solid resins of the latter type a great part of the terminal glycidyl groups is usually present in hydrolyzed form as glyceryl groups, due to the methods of preparation.

Suitable epoxy resins of this type have molecular weights from 2000 to 4000, epoxy equivalent weights of the same order, and have from 0.35 to 0.40 hydroxyl equivalents per 100 g; the epoxy content is too low to effect sufficient cross-linking without a cross-linking agent.

Another suitable polyether of the latter type is a high-molecular weight linear polyhydroxyl ether, having a molecular weight of more than 20,000 and containing 0.35 hydroxyl equivalents per 100 g. Molecular weights herein are average molecular weights ($\overline{Mn}$) as usual in polymeric compounds.

Suitable derivatives of epoxy resins are hydroxyl-containing esters, such as esters obtained by esterification of one or both epoxy groups of the lower epoxy resins (wherein r in the above formula has a value of from 0 to 4) with a monocarboxylic acid, preferably a hydroxyalkane monocarboxylic acid, such a glycolic acid, lactic acid or preferably dimethylol propionic acid. Such esterifications are preferably carried out at temperatures below 150° C. to avoid esterification of hydroxyl groups, in the presence of catalysts known to accelerate epoxycarboxyl addition reactions, such as tertiary amines, quaternary ammonium salts, quaternary phosphonium salts or stannous octoate.

Other suitable epoxy resin derivatives are soluble adducts with primary or secondary amines, in particular amines having one or more hydroxyalkyl groups, such as diethanolamine. The epoxy resin here is preferably one of the above formula, wherein r is from 3 to 4.

Other suitable epoxy resin/amine adducts, in particular suitable for cathodic electrodeposition, will be described hereinafter.

Further suitable compounds to act as component (1) are polymeric reaction products of caprolactone with polyhydric alcohols, and resinous polyols prepared by copolymerization of styrene with allyl alcohol.

Still further suitable compounds to act as component (1) are copolymers of hydroxyalkyl acrylates and methacrylates with other copolymerizable ethylenically unsaturated compounds, such as styrene, methyl methacrylate, butyl acrylate, and vinyl esters, in particular vinyl esters of branched monocarboxylic acids. Copolymers containing the residues of the latter component can be made according to the process described in British Pat. No. 1,418,372.

The compounds outlined above are in particular suitable for thermosetting compositions to be applied as solutions in organic solvents. Compounds which are solid at room temperature and have softening points above 70° C. can also be used in thermosetting powder compositions.

For water-borne paints, in particular suitable for cathodic electrodeposition, a further group of compounds has been found very useful as component (1).

Cathodic electrodeposition for applying a resinous coating to metals is known in the art. The binder is usually prepared by reacting a diglycidyl ether of a dihydric phenol, such as 2,2-bis(4-hydroxyphenyl)propane with secondary and/or primary amines; the amine adduct can be protonized with an acid, to make it water-soluble, and to provide the electrical charge for transport to the cathode. Suitable primary amines are mono-alkanolamines, for example, monoethanolamine and mono-isopropanolamine. Very suitable is 3-(N,N-dimethylamino)propylamine. Suitable mono-secondary amines are dialkanolamines, for example, diethanolamine, and di-isopropanolamine. A very suitable di-secondary amine is an addition product of 1 mole of 1,6-diaminohexane with 2 moles of glycidyl esters of branched monocarboxylic acids. The reaction of the amines with the diglycidyl ethers can be carried out in one or more steps; thus a mono-secondary amine may be reacted first with the diglycidyl ether, and a primary amine and/or a di-secondary amine can then be added.

Component (2) has more than one beta-hydroxyl ester group per molecule for sufficient cross-linking at acceptable curing temperature within acceptable time, for example at temperatures up to 200° C. and curing times of up to 30 minutes.

According to the invention the beta-hydroxyl ester group is substituted in the gamma-position by a hydroxyl, amino and/or transferable ester group derived from polycarboxylic acid. Transferable in this connection means that such an ester group may be transesterified under curing conditions.

Although the invention relates to such esters of polycarboxylic acids in general, it is of particular advantage for esters of dicarboxylic acids, as compared with the beta-hydroxyalkyl esters which do not have such a gamma-substituent and are similarly derived from a dicarboxylic acid.

Components (2) having a gamma-hydroxyl group can be prepared by esterification of a polycarboxylic acid with glycidol or glycerol. Such cross-linking components provide in general a better cure at lower temperature. Suitable dicarboxylic acids are, for example, adipic acid, azelaic acid, terephthalic acid, isophthalic acid, and dimerized unsaturated fatty acids. Glycidol may be reacted in a molar ratio of 2:1 or slightly more, at moderate temperatures, for example 110°-150° C., to form essentially monomeric beta-gamma-dihydroxy-propyl esters.

Glycerol may be reacted with dicarboxylic acids at higher temperatures, for example 180°-250° C., with elimination of the water formed until essentially all acidity is eliminated. The product is in general a polyester having the general formula:

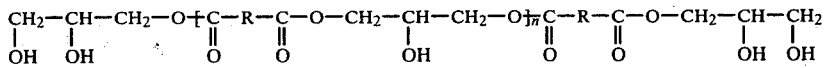

wherein n may have an average value of from 0 to 30, depending on the molar ratio glycerol/dicarboxylic acid, and R is the hydrocarbon residue of the dicarboxylic acid. Such polyesters, with n being 1 or higher, have in the main chain one or more transferable beta-hydroxy alkyl ester groups derived from a polycarboxylic acid, and have in general two terminal beta-gamma-dihydroxy alkyl groups. The formation is attributed to the greater reactivity of the primary hydroxyl group.

For preparing an ester wherein n=0, a large excess of glycerol has to be used, and if such a polyester is required, it can better be prepared by reaction of the dicarboxylic acid with glycidol, as described hereinbefore. For the esterification with glycerol, the reaction time can sometimes be reduced considerably by addition, at a certain acid value, of the calculated amount of a mono- or diepoxide, such as glycidol or a diglycidyl ester. As the reaction of carboxyl with epoxide is faster than the normal esterification reaction, the saving of time may be considerable.

In reacting the dicarboxylic acid with glycidol or glycerol, catalysts may be added, such as dibutyl tin compounds or organic chromium compounds.

Components (2) having transferable beta-hydroxyalkyl ester groups in the main chain can also be prepared by reacting a dicarboxylic acid with diglycidyl ester of a dicarboxylic acid, preferably in a glycidyl/carboxyl ratio of at least 1:1. Terminal groups in the polyester so produced will be glycidyl groups or beta-gamma-dihydroxyalkyl groups, the latter when part of the glycidyl groups has been hydrolyzed, for example due to the method of preparation of the glycidyl ester. Reaction of glycidyl ester and carboxylic acid can be performed at temperatures from 100° to 180° C., preferably in the presence of a catalyst, for example a tertiary amine. Dicarboxylic acid and glycidyl compound or glycerol are reacted until an acid content of not more than 0.18 meq/g solids indicates that esterification is essentially complete. This is usually accomplished with 10 hours. When the acidity remains more than 0.25 meq/g the reaction may be completed by further addition of glycidyl compound in a small amount.

The compounds having transferable ester groups in the main chain have two ester groups available for transesterification per mol of triol (glycerol) which evaporates and this may reduce the weight loss on cure considerably. A further advantage of such polyesters is that they have a higher viscosity than monomeric diester. This may contribute to a higher throwing power and a better appearance, such as less cratering and less pinholing. Further, a reduced sensitivity to hydrolysis may contribute to a better stability of aqueous paints.

The beta-hydroxyalkyl ester groups of component (2) may further be substituted in the gamma-position by an amino group, preferably a dialkylamino group, such as a dimethyl- or diethylamino group. Such cross-linkers are of particular interest for cathodic electrodeposition, in particular when the gamma-substituent is a dialkylamino group.

Cathodic electrodeposition requires sufficient protonization of amino groups by at least partial neutralization with an acid, and this protonization is promoted by the basic strength of the amino groups. To this end, strongly basic amino groups, such as dimethyl- or diethylamino groups are sometimes built into component (1), for example by reacting a polyepoxide with an amine mixture, which contains 3-(N,N-dimethylamino)-propylamine. Such strongly basic amino groups remain in the cured coating, and may reduce desirable properties such as salt spray resistance.

According to one aspect of the invention such lower dialkylamino groups are incorporated in component (2), in gamma-position with regard to the ester groups, for example by reaction of dimethylamine or diethylamine with a polyglycidyl ester of a polycarboxylic acid produced is easy to protonize for cathodic electrodeposition, and upon cure the gamma-amino alkane diol produced by transesterification evaporates. The remaining cured coating does not contain those strongly basic amino groups, and has an improved resistance to chemicals such as salt spray.

The transesterification-promoting metal compound is preferably a metal salt or complex that is soluble in liquid hydrocarbons, such as white spirit or xylene. A commercially available concentrated solution in such a solvent can then easily be homogeneously diluted with a part of one of the other binder components, to provide a master batch containing the accelerator. In view of the small amounts of accelerator needed in the final binder composition this technique is recommendable. Suitable salts meeting that requirement are in general 2-ethyl hexoates (octoates) and naphthenates. Further, when these metal salts or complexes are insoluble or substantially insoluble in water, potential adverse effects by leaching out of accelerator into the aqueous phase of the aqueous suspensions are avoided.

Very suitable in view of their generally high activity are, for example, salts (octoates or naphthenates) of lead, zinc, calcium, barium and iron(III). A suitable example of a metal complex is titanium acetyl acetonate. Other suitable salts, although in general less active than those mentioned above, are salts of tin(II), manganese, cobalt and dibutyltin, for example dibutyltin dilaurate. Further, metal salts that can be mentioned in general are octoates and naphthenates of the alkali and earth alkali metals, of the lanthanides, and of zirconium, cadmium, chromium, and acetyl acetonate complexes of lead, zinc, cadmium, cerium, thorium and copper.

Mixtures of such salts and/or complexes can also be used. Some of the salts or complexes mentioned above are known as esterification and transesterification catalysts for the preparation of alkyd resins, epoxy resin esters, and linear polyesters for fibers, in general for the preparation of fusible polyesters which are soluble in organic solvents. However, the temperatures used there are generally far above 200° C., the reaction times at least some hours, and the amount of catalyst is usually very low, below 0.1% by weight of the polyester. None of these uses indicated that these salts could be used as cross-linking accelerators in coatings, i.e. for the formation of insoluble, infusible polyester-like coatings, as in the present binder compositions.

In the present compositions these accelerating salts or complexes can be used in amounts of 0.1–6, preferably 1-6 percent of the combined weights of components (1) and (2). In view of the varying metal content of available metal salts or complexes or solutions thereof the amount of catalyst is more conveniently indicated by the metal content in the compositions; metal contents of 0.3 to 2.0 percent by weight are suitable in general, and metal contents of 0.5-1.8 percent by weight are preferred.

Other transesterification-promoting metal compounds that can be used in the present compositions are certain metal salts and oxides that are insoluble in liquid hydrocarbons, but may be soluble in other solvents such as water, alcohols, ethers, ketones, and esters, or mixtures thereof. Insoluble in liquid hydrocarbons can be defined more precisely in that the solubility in toluene at 20° C. should not be more then 0.02 percent by weight. These metal compounds are usually solids at room temperature, and may be used in finely divided form and/or in solution. Examples are the pigments lead silicate, red lead ($Pb_3O_4$), lead oxide (PbO), zinc chromate, zinc tetraoxydichromate, and lead silico chromate, the oxide antomony trioxide, and the acetates, formiates and carbonates of Pb, Zn, Fe, Li, Cd and Bi. The quantity of the pigments needed is sometimes such as to exclude their use when the pigmentation they will provide (e.g., white, yellow or red) is not desired. On the other hand, such pigments may be desirable for improvement of corrosion resistance, for example in primers. These pigments may sometimes provide the desired transesterification activity in pigment/binder weight ratios from 0.02:1 upwards, more preferably from 0.1;1 upwards. Water-soluble salts, sometimes in the form of hydrates or aqueous solutions, may be desirable in aqueous coating compositions. Metal salts as mentioned above may be used in amounts of 1-8, preferably 3-8 percent by weight of the binder. Complex-forming agents may be added to improve the activity of some of these metal compounds, in particular those of zinc, upon cure, and/or to improve surface properties of a cured coating. Examples are acetyl acetic esters, acetyl acetone, 8-hydroxy quinoline. For example, zinc oxide (inactive in the gelation test) may show slight activity in an electrodeposition test; activity and surface appearance may then be improved by addition of a complex-forming agent.

Mixtures of metal compounds that are soluble and insoluble in liquid hydrocarbons can also be used.

Determination of the gelation time on a hot plate at 180° C. is a very useful rapid test using simple equipment for a first indication of activity. Components (1) and (2) are mixed, for example, in a 80/20 weight ratio, with the metal compound to be tested, and the mixture is subjected to the gelation test. A mixture without accelerator will have a gelation time of 600 seconds or more, whereas satisfactory cure can be expected at gelation times of 400 seconds and below. The gelation test can be used to obtain a general indication of suitability of a metal compound or mixture, and for further selection of suitable components and their weight ratio. Only small samples will suffice (about 0.5 g of solids for each test), the compounding is very easy, and the result is available immediately after the test.

The weight ratio of components (1) and (2) may vary between wide limits, in dependence of the reactivity of the components, the desired cure schedule, and the desired properties of the cured coating; the optimum ratio can be determined as usual; as a general guide line that weight ratio can be chosen from 90:10 to 50:50, and more particular from 80:20 to 60:40.

The components can be mixed simultaneously or in any order that would be more convenient. The components and/or the compositions may be diluted with suitable volatile organic solvents, for example to regulate the viscosity or the solids content of the final paint or lacquer. Conventional paint additives may be incorporated, such as pigments, fillers, dispersants, stabilizers, flow control agents, and the like.

The lacquers or paints can be applied by usual methods, such as by brush, roller, by spraying, dipping, and the like onto a variety of materials, preferably metals, such as bare steel, phosphated steel, zinc, tin plate (as a can lacquer), as the case may be as the sole coating layer or as a primer or top coat. For use as electrodeposition primers the component or components having amine groups is/are protonized by neutralizing 20 to 100% of the amino functions with an acid, preferably an organic carboxylic acid, such as formic acid, acetic acid, citric acid or preferably lactic acid. These protonized binders may be used in 2-20% by weight in aqueous dilutions, solutions or dispersions in cathodic electrodeposition baths. The compositions may first be diluted with a water-soluble organic solvent such as a glycol ether, for example to simplify the neutralization or the dilution with water. The aqueous electrodeposition baths may also contain conventional additives, such as pigments, fillers, dispersants, stabilizers, flow control agents, and the like. The baths can be used for applying coatings to steel that has or has not been phosphated.

The invention is illustrated by the following illustrative examples. Parts therein are parts by weight, unless otherwise stated or apparent from the context. Analytical data (amino, epoxy, hydroxyl) are based on non-volatile matter.

Polyether D is a commercial solid glycidyl polyether of 2,2-bis(4-hydroxyphenyl)propane having an epoxy molar mass of 472, a hydroxyl content of 0.29 equivalent per 100 g, and a molecular weight ($\overline{Mn}$) of about 900.

Glycidyl ester ClOE is a commercial glycidyl ester of saturated aliphatic monocarboxylic acids, wherein the carboxyl group is attached to a tertiary or quaternary carbon atom and which monocarboxylic acids have an average 10 carbon atoms per molecule; the glycidyl ester has an epoxy equivalent weight of 250.

Impact resistance or impact strength (IS) is the reversed impact strength, determined according to the British Standard Falling Ball Test, but recorded in cm.kg; >90 cm.kg indicates very good cure. Salt spray resistance was according to ASTM-B 117-64 and recorded as mm.loss of adhesion from scratch after the number of days indicated. MEK rubs is the number of rubs to be given to cured coating with a cloth wetted with methyl ethylketone (MEK). MEK rubs 50 is an indication for good cure.

EXAMPLE I

Hydroxyl-Containing Resinous Compounds, Used for Further Examples (a) Adduct of Polyether D, monoethanolamine, and diethanolamine. Polyether D (1888 parts, 4 epoxy equivalents) was melted and reacted with a mixture of monoethanolamine (61 parts, 1 mol.) and diethanolamine (210 parts, 2 mol.) at 140°-145° C. during 3 hours. The hot liquid adduct was poured onto aluminum foil and allowed to cool. The solid brittle product had a residual epoxy content below 0.01 eq./100 g; the calculated molar weight 2160.

(b) Linear polyether/amine adduct in solution. To a solution of Polyether D (2832 parts, 6 epoxy equivalents) in ethylene glycol monobutyl ether (1610 parts) were added diethanolamine (210 parts, 1 mol.), 3-(N,N-dimethylamino)propylamine (102 parts, 1 mol.) and an adduct of 1,6-diamino hexane and glycidyl ester ClOE (616 parts, 1 mol. adduct). This adduct had been prepared by reacting 1,6-diamino hexane (1160 parts, 10 mol.) with glycidyl ester ClOE (5000 parts, 20 mol.) at 80° C. for 3 hours. The mixture of the Polyether and the amines was reacted by heating first at 85°–90° C. for 2 hours with stirring, and then at 120° C. for 1 hour. The residual epoxy content was zero, N-content: 1.60 meq./g, OH-content: 0.56 eq./100 g, solids content: 70% w. The calculated molecular weight was 3760.

(c) Linear polyether/amine adduct in solution. Prepared as in Example I (b) from the following ingredients: Polyether D (2832 parts, 6 epoxy equivalents), ethylene glycol monobutyl ether (1594 parts), diethanolamine (210 parts, 2 mol.), monoethanolamine (61 parts, 1 mol.), adduct of 1,6-hexane diamine and glycidyl ester ClOE (616 parts, 1 mol. adduct).

The resulting adduct had a residual epoxy content of zero, an N-content of 1.34 meq/g and an OH-content of 0.57 eq./100 g; solids content 70% w. The calculated molecular weight was 3720.

(d) Resinous polyol RJ-100 was a commercial copolymer of styrene and allyl alcohol having a molecular weight of about 1150 and a hydroxyl content of 0.45 eq./100 g.

EXAMPLE II (a) Bis(2,3-dihydroxy propyl)azelate

Azelaic acid 94 parts, 0.5 mol.) was heated to 120° C. A catalyst, AMC-2 (commercial chromium salt, 0.8 g) was added. Glycidol (81.5 g, 1.1 mol.) was added dropwise with stirring during 1 hour while keeping the temperature within 115° and 125° C. To complete the reaction, heating at 120° C. was continued for another hour. The product was a viscous liquid which crystallized very slowly to a waxy solid. It had residual acid and epoxy contents of 0.03 and 0.07 meq./g, respectively, and a purity of about 95%; 2,3-dihydroxypropyl groups per molecule: 2; molecular weight; 336.

(b) Oligomeric ester from terephthalic acid and glycerol, molar ratio 1:2

Terephthalic acid (166 parts, 1 mol.), glycerol (184 parts, 2 mol.) and dibutyl tin oxide (1.75 parts) were heated at 210°–245° C. with stirring under a nitrogen blanket. Volatiles passed a steam-heated condenser and water was collected in a Dean & Stark trap. After 6 hours 36 parts of water had been collected and the residual acid content was 0.10 meq./g (degree of esterification >98%). The resulting ester was a clear viscous mass, having two 2,3-hydroxypropyl ester groups per molecule.

(c) Bis-(2-hydroxy-3-diethylaminopropyl)adipate

Diethylamine (73 parts, 1 mol.) was added to ice-cold diglycidyl adipate (129 parts, 0.5 mol.) and the mixture was left in an ice bath for 3 hours. After standing at room temperature for 16 hours, the reaction was completed by warming to 40° C. for 3 hours. The light-brown liquid product had an epoxy content of zero and an N-content of 4.80 meq./g (theory: 4.95); 2-hydroxy-3-diethylamino propyl groups per molecule: 2; molecular weight: 404 (calculated).

(d) Bis-(2-hydroxy-3-diethylaminopropyl)terephthalate

Diglycidyl terephthalate (145 parts, 1.0 epoxy equivalent) was dissolved in 1,2-dimethoxyethane (145 parts). Diethyl amine (73 parts, 1 mol.) was added at room temperature. The mixture was heated at 60° C. for 20 hours and part of the solvent (75 parts) was stripped off in vacuo. The product, a light-brown viscous solution, had a solids content of 4.45 meq./g theory: 4.59). 2-hydroxy-3-diethylaminiopropyl groups per molecule: 2; molecular weight: 436 (calculated).

(e) Tris-(2-hydroxy-3-diethylaminopropyl)trimellitate

Triglycidyl trimellitate (166 parts, 1.0 epoxy equivalent) was mixed with 1,2-dimethoxy ethane (102 parts) and diethyl amine (73 parts, 1 mol.). The mixture was heated at 50° C. for 16 hours. The product, a brown viscous liquid, had a solids content of 70% w, an epoxy content of zero, and an N-content of 4.10 meq./g (theory: 4.18); 2-hydroxy-3-diethylamino propyl groups per molecule: 3; molecular weight: 717 (calculated).

(f) Polyester from diglycidyl adipate and azelaic acid

Diglycidyl adipate (65 g, 0.50 epoxy equivalents) and azelaic acid (47 g, 0.25 mol.) were melted at 120° C. Benzyl diemthylamine (catalyst, 0.30 g) was added and the mixture was stirred at 150°–160° C. for 3 hours when the epoxy content was zero and the residual acid content was 0.23 meq./g. More diglycidyl adipate (3 g, 0.023 epoxy equivalent) was added and heating at 160° C. was continued for one hour. The resulting polyester was a viscous, light-brown mass having an epoxy content of zero and an acid content of 0.08 meq/g. The molecular weight, determined by gel permeation chromatography (polystyrene calibration) was 10,200 ($\overline{Mw}$).

(g) Polyester from diglycidyl terephthalate and azelaic acid

Diglycidyl terephthalate (147.5 g; 1.0 epoxy equivalent) and azelaic acid (94 g; 0.50 mol) were dissolved in methyl isobutyl ketone (161.5 g) by warming to 100° C. Benzyl dimethyl amine (catalyst, 0.7 g) was added and the solution was stirred under reflux for 5 hours. The product was a viscous solution having a solids content of 60% w and residual epoxy and acid contents of 0.05 and 0.08 meq/g, respectively. The molecular weight ($\overline{Mw}$) was 18,950 according to gel permeation chromatography.

(h) Polyester from azelaic acid and glycerol

Azelaic acid (451.2 g; 2.4 mol), glycerol (294.5 g; 3.2 mol) and dibutyl tin oxide (catalyst, 3.3 g) were heated at 180°–220° C. with stirring under a nitrogen blanket. Volatiles passed a stream-heated condenser and water was collected in a Dean & Stark trap. After 7 hours 86 g (4.8 mol) of water were collected and the residual acid content was 0.18 meq/g. The resulting polyester was a clear viscous mass with a molecular weight ($\overline{Mw}$) of 5660 (GPC analysis).

(i) Diester from dimer fatty acid and glycidol

Prepared as in Example II(a) from dimer fatty acid (285 g; 1.0 COOH equivalent=0.5 mol), glycidol (81.5 g, 1.1 mol) and AMC-2 catalyst (1.8 g). The liquid product had residual epoxy and COOH contents of 0.05 and 0.01 meq/g, respectively. Molecular weight: 718; 2,3-dihydroxypropyl groups per molecule: 2.

EXAMPLE III

Reactivity of Various Polyester Cross-linking Agents in Combination with Hydroxyl-containing Resins All details and results have been collected in Table I. Hydroxyl-containing resins from Example I and cross-linking polyesters from Example II were blended in weight ratios as indicated, and thinned with ethylene glycol monobutyl ether to a solids content of 60% w. A metal salt catalyst (commercial 2-ethyl hexanoate salts of $Pb^{2+}$, $Zn^{2+}$ and $Fe^{3+}$) was added to give a metal content of 0.67% w (on solid binder). The resulting lacquers were applied by wire rod applicator onto An-phosphated steel panels (0.7 mm thick) to obtain a dry-film thickness of 25–30 micrometers. All coatings were stoved as specified in Table I and the degree of cross-linking achieved was assessed by evaluating Condition of hot film directly after stoving (liquid=l, or gelled=g),
MEK rubs, and
impact strength.

ple II(i) (34.5 g), lead 2-ethyl hexanoate (2.5 g of a commercial product containing 33% Pb), and acetic acid (4.3 g). Demineralized water (246 g) was added gradually to form a binder solution of 30% solids.

A pigment paste was prepared by dispersing clay ASP-100 (10 g), talc (11.25 g), carbon black (2.5 g) and lead silicate (1.25 g) with part of the binder solution (200 g) in a sand mill during 45 minutes. The pigment paste was thinned with the remainder of the above-mentioned binder solution (217 g) and finally with demineralized water (558 g) to give a black paint with a solids content of 15% w.

The paint had a pH of 6.2 and a specific conductivity of 980 micro S/cm (25° C.). The paint was electrodeposited cathodically onto degreased cold-rolled steel panels (0.7 mm thick) at a voltage of 50 V (direct current) during 2 minutes. The coated panels were rinsed with water and stoved as specified below. Smooth semi-glossy coatings were obtained which showed a good degree of cross-linking at stoving temperatures as low as 140°–150° C.

TABLE I

Coatings as described in Example III

| Experiment No. | Hydroxyl-containing resin of Example | Cross-linking polyester of Example | Resin/cross-linker weight ratio (solids) | Catalyst type | Stoving 30 min. at °C. | Hot film | MEK rubs | Impact Strength cm.kg | Cross-linking |
|---|---|---|---|---|---|---|---|---|---|
| 1 | I(a) | II(a) | 79:21 | Pb | 140 | g | ~30 | <5 | ± |
| 2 | I(a) | II(a) | 79:21 | Pb | 160 | g | >50 | >90 | ++ |
| 3 | I(a) | II(a) | 79:21 | Pb | 180 | g | >50 | >90 | ++ |
| 4 | I(a) | II(a) | 79:21 | Zn | 160 | g | >50 | >90 | ++ |
| 5 | I(a) | II(a) | 79:21 | Fe | 160 | g | >50 | >90 | ++ |
| 6 | I(b) | II(a) | 85:15 | Pb | 140 | g | ~50 | 40–50 | + |
| 7 | I(b) | II(a) | 85:15 | Pb | 160 | g | >50 | >90 | ++ |
| 8 | I(b) | II(a) | 85:15 | Pb | 180 | g | >50 | >90 | ++ |
| 9 | I(b) | II(a) | 85:15 | Zn | 160 | g | >50 | >90 | ++ |
| 10 | I(b) | II(a) | 63:37 | Pb | 160 | g | ~25 | <5 | ± |
| 11 | I(b) | II(a) | 63:37 | Pb | 180 | g | >50 | ~20 | ++ |
| 12 | I(b) | II(b) | 78:22 | Pb | 160 | g | >50 | >90 | ++ |
| 13 | I(b) | II(b) | 78:22 | Pb | 180 | g | >50 | >90 | ++ |
| 14 | I(b) | II(c) | 82:18 | Pb | 180 | g | ~25 | <5 | ± |
| 15 | I(b) | II(c) | 70:30 | Pb | 180 | g | >50 | >90 | ++ |
| 16 | I(a) | II(d) | 71:29 | Pb | 160 | g | ~25 | <5 | ± |
| 17 | I(a) | II(d) | 71:29 | Pb | 180 | g | >50 | >90 | ++ |
| 18 | I(b) | II(d) | 81:19 | Pb | 160 | g | ~50 | 20–30 | + |
| 19 | I(b) | II(d) | 81:19 | Pb | 180 | g | >50 | >90 | ++ |
| 20 | I(b) | II(e) | 72:28 | Pb | 160 | g | >50 | >90 | ++ |
| 21 | I(b) | II(e) | 72:28 | Pb | 180 | g | >50 | >90 | ++ |
| 22 | I(b) | II(i) | 72:28 | Pb | 160 | g | >50 | >90 | ++ |

Conclusions from these data for the degree of cross-linking were:
++ very good
+ good
± moderate
− poor.

From the data in Table I it can be concluded that the reactivity of various polyesters is influenced by the substitution in the alkoxy part of the ester functions and that in particular esters containing 2,3-dihydroxy propyl groups are very active cross-linkers.

EXAMPLE IV

Cathodic Electrodeposition Paint

The epoxy resin/amine adduct of Example I(b) (129.3 g; 90.5 g solids) was mixed with the polyester of Exam-

| Coating | | | | Salt Spray resistance |
|---|---|---|---|---|
| Stoving conditions °C./minutes | thickness micrometer | MEK rubs | Impact strength cm.kg | (mm underrust after 20 days) |
| 180/30 | 15–16 | >50 | >90 | ~5 |
| 160/30 | 15–17 | >50 | >90 | 3–6 |
| 150/30 | 15–17 | >50 | >90 | 3–5 |
| 140/30 | 16–18 | 40–50 | >90 | 3–5 |

EXAMPLE V

Cathodic Electrodeposition Paint

The epoxy resin/amine adduct of Example I(c) (144.6 g; 101.2 g solids) was mixed with the polyester of Example II(d) (31.3 g 23.8 g solids), lead 2-ethyl hexanoate (2.5 g of a commercial product containing 33% Pb), polyacrylate flow control agent (0.1 g) and acetic acid (7.2 g). Demineralized water (261 g) was added gradually to form a binder solution of 28% solids.

A pigment paste was prepared by dispersing clay ASP-100 (10 g), talc (11.25 g), carbon black (2.5 g) and lead silicate (1.25 g) with part of the aqueous binder solution (200 g) during 45 minutes in a sand mill.

The pigment paste was thinned with the remainder of the aqueous binder solution (246 g) and with demineralized water (529 g) to give a black paint with a solids content of 15% w. The paint had a pH of 6.4 and a specific conductivity of 2200 micro S/cm (25° C.).

The paint of this Example and the paint of Example IV were electrodeposited cathodically onto solvent-degreased cold-rolled steel panels at voltages specified in the Table during 2 minutes. The coated panels were rinsed with water and stoved at 180° C. during 30 minutes. Smooth, semi-gloss panels were obtained which showed the following properties:

| Paint of Example | pH | ED voltage V | Coating thickness micrometer | MEK rubs | Impact strength cm.kg | Salt Spray resistance (mm under-rust after 28 days) |
|---|---|---|---|---|---|---|
| V | 6.4 | 100 | 16–18 | >50 | >90 | 1–2 |
| IV | 6.2 | 50 | 14–17 | >50 | >90 | 6–10 |

This Example demonstrates the very good salt spray resistance (28 days) obtained with a binder in which the polyester contains gamma(diethylamino) groups.

EXAMPLE VI

Evidence of Removal of Basic Material From Coatings During Stoving

The paint of Example V was electrodeposited cathodically onto degreased, cold-rolled steel panels (110×70×0.7 mm) and the coated panels were dried in vacuo at 50° C. until constant weight (5 hours). 10 Panels (total coating weight 3.15 g) were then stoved in a closed glass container at 180° C. during 30 minutes. Volatile material condensed on the glass walls after cooling was quantitatively recovered with methylene chloride. After evaporation of the methylene chloride, a residue of 0.41 g (13% of coating weight) was obtained. The IR-spectrum of the residue was virtually identical with that of 1-diethylamino-2,3-dihydroxy propane (prepared from equimolar amounts of diethylamine and glycidol). The amino content of the residue was high, 5.6 meq/g, indicating that a substantial amount of amine functionality had been removed from the coating during stoving.

EXAMPLE VII

Cathodic Electrodeposition Paints

Epoxy resin/amine adduct of Example I(b), polyesters of Example II(f)-(h), lead-2-ethyl hexanoate (a commercial material containing 33% Pb), acetic acid and ethylene glycol monobutyl ether were blended in amounts specified in Table II. Demineralized water was added as specified to form aqueous solutions of 30% solids content. Part of these aqueous solutions (200 g) was used to disperse the following pigments in a sand mill during 45 minutes: clay ASP-100 (10 g), talc (11.25 g), carbon black (2.5 g) and lead silicate (1.25 g). The resulting pigment pastes (Hegman fineness of grind <10) were thinned with the remainders of the aqueous solutions (217 g) and with demineralized water (558 g) to give black paints with the following characteristics:

solids content: 15% w
pigment/binder weight ratio: 0.20
binder/organic solvent weight ratio: 70:30 pH values and specific conductivities of these paints are given in Table II. The paints were electrodeposited cathodically onto degreased, cold-rolled steel panels at voltages of 150–200 V (direct current) during 2 minutes. The coated panels were rinsed with water and pre-dried at 50° C./150 mbar until constant weight (5–7 hours). The coating weight was determined before and after stoving which took place at temperatures/times specified in Table II. Table II shows all coating properties evaluated.

| Paint No. | (1) | (2) | (3) |
|---|---|---|---|
| Adduct of Example I(b) | 157.1 | 157.1 | 157.1 |
| (solids content), g | (110) | (110) | (110) |
| Polyester of Example II(f), g | 15 | — | — |
| Polyester of Example II(g), g | — | 25+ | — |
| Polyester of Example II(h), g | — | — | 15 |
| Adduct/polyester weight ratio | 88:12 | 88:12 | 88:12 |
| Pb-2-ethyl hexanoate, g | 2.5 | 2.5 | 2.5 |
| Acetic acid, g | 5.3 | 5.3 | 5.3 |
| Ethylene glycol mono-butyl ether, g | 6.4 | — | 6.4 |
| Water (30% solids) | 230.5 | 227 | 230.5 |
| Paint properties | | | |
| pH | 6.0 | 5.9 | 6.0 |
| Specific condictivity micro S/cn (25° C.) | 2165 | 2230 | 2165 |
| Coatings stoved at 180° C./30 min. | | | |
| Appearance | smooth | smooth | smooth |
| Thickness, micrometer | 19–21 | 16–18 | 17–21 |
| Weight loss, % w | 9 | 10 | 9 |
| MEK rubs | >50 | >90 | >50 |
| Impact strength, cm.kg | >90 | >90 | >90 |
| Salt spray, mm rust creep (20 days) 3–5 | 4–6 | 4–6 | |
| (20 days) | | | |
| Coatings stoved at 160° C./30 min. | | | |
| Appearance | smooth | smooth | smooth |
| Thickness, micrometer | 19–24 | 19–22 | 21–23 |
| Weight loss, % w | 8 | 9 | 9 |
| MEK rubs | >50 | >90 | >50 |
| Impact strength, cm.kg | >90 | >90 | >90 |
| Salt spray, mm rust creep (20 days) | ~5 | 6–8 | 4–6 |

+solution containing 15 g solids

What is claimed is:

1. A thermosetting resinous binder composition, heat-curable in combination with a transesterification-promoting metal compound as a catalyst to provide an insoluble infusible coating, comprising a mixture of:
   (1) a non-acidic resinous compound essentially free of ethylenical unsaturation, having a molecular weight of at least 900 and a hydroxyl content of at least 0.2 equivalent per 100 g, and
   (2) as cross-linking agent a non-acidic polyester of a polycarboxylic acid having more than one beta-hydroxyl ester group per molecule, at least one of components (1) and (2) having a hydroxyl or beta-hydroxyl ester functionality, respectively, of more than 2, characterized in that the beta-hydroxyl ester group is substituted in the gamma-position by a hydroxyl, amino and/or transferable ester group derived from a polycarboxylic acid.

2. The binder composition of claim 1 wherein component (2) is derived from one or more dicarboxylic acids.

3. The binder composition of claim 1 or 2 wherein component (2) is a polyester prepared from a dicarboxylic acid and a diglycidyl ester of a dicarboxylic acid.

4. The binder composition of claim 1 or 2 wherein component (2) is prepared from a dicarboxylic acid and glycidol or glycerol.

5. The binder composition of claim 1 wherein component (2) is prepared from a dialkylamine and a polyglycidyl ester of a polycarboxylic acid.

6. The binder of claim 1 wherein component (1) is an epoxy resin/amine adduct, said binder being protonized by at least partial neutralization with an acid.

7. An aqueous paint bath for cathodic electrodeposition comprising the binder of claim 6.

8. A process for the preparation of an insoluble, infusible coating on a surface, comprising applying a binder composition of claim 7 onto the surface, and curing the coating at a temperature not higher than 200° C.

* * * * *